A. F. ROCKWELL.
PROCESS OF SIZING AND SHAPING.
APPLICATION FILED JAN. 10, 1908.

926,898.

Patented July 6, 1909.

WITNESSES:

INVENTOR:
Albert F. Rockwell,
BY
his ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

PROCESS OF SIZING AND SHAPING.

No. 926,898.  Specification of Letters Patent.  Patented July 6, 1909.

Application filed January 10, 1908. Serial No. 410,261.

*To all whom it may concern:*

Be it known that I, ALBERT F. ROCKWELL, a citizen of the United States, residing at Bristol, county of Hartford, State of Connecticut, have invented a certain new and useful Process of Sizing and Shaping, of which the following is a full, clear, and exact description, such as will enable others skilled in the art to which it appertains to make and use the same, reference being had to the accompanying drawings, forming part of this specification.

My invention relates to processes of sizing and shaping recessed metal articles, such, for example, as rings and cylinders, the present process being particularly valuable when practiced upon articles which it is desired to harden.

Heretofore it has been customary to give desired size and shape to the recesses of metal articles by accurately cutting or grinding. This requires skilful and careful work and is expensive. Furthermore, when it is desired that the articles be hardened, it has been customary to make the article with its recess of desired size and shape, to then heat the article and to then cool it, as by subjecting it to an oil bath, the cooling being effected while the article has the walls of its recess or recesses unsupported in any way. The result has been that the articles warp more or less during cooling and their recesses lose their particular size and shape, so that after hardening the hardened articles have to have their recesses accurately ground or machined anew.

One object of my invention is to provide a process whereby a recess of exact size and shape can be inexpensively produced in a metal article.

A further object of my invention is to provide a process whereby a recessed metal article can have its recess accurately sized and shaped during the process of hardening.

To these ends, and also to improve generally upon processes of the character indicated, my invention consists in the various matters hereinafter described and claimed.

Figure 1:
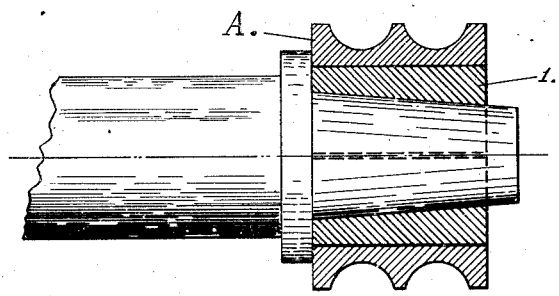
Figure 2:
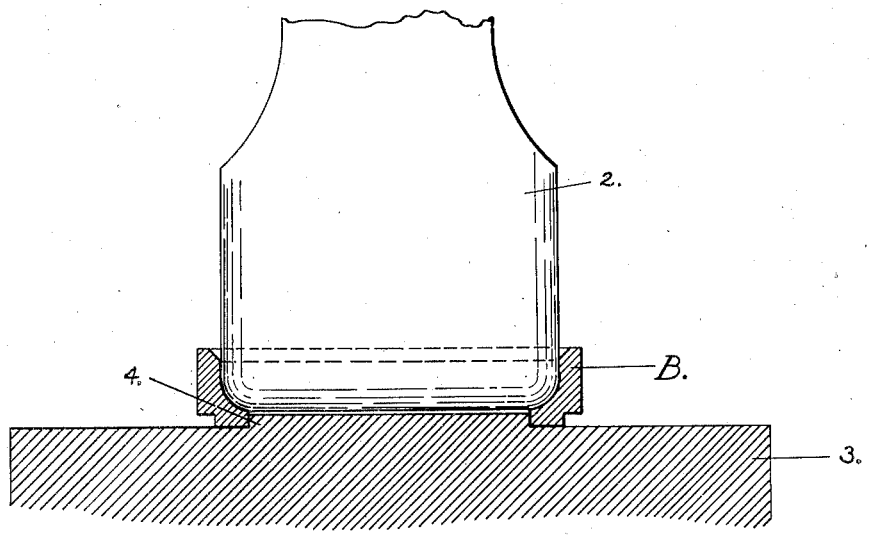

In the accompanying drawings: Figure 1 represents one step of my process when practiced upon such an article as a cylinder; and Fig. 2 represents such step of my process as preferably practiced when applied to such an article as a dished ring.

In carrying out my process, the article is first formed in any convenient manner, such, for example, as by machining, the recess in the article being preferably of slightly smaller diameter than the finished size. The article is then heated, whereby it expands, and in its expanded condition it is placed about a mandrel whose exterior presents the size and shape desired of the recess in the finished product. The article is then permitted to cool about the mandrel and is then removed therefrom. I have found that by this method the recesses can be most accurately sized and shaped, requiring no machining or grinding after the article is removed from the mandrel.

By initially forming the articles with their recesses of slightly smaller diameter than is desired of the recess in the finished article, accuracy in sizing the recess is rendered unnecessary in the operation of cutting or otherwise initially producing the article, and when the article is heated, the expansion is sufficient to enable the mandrel to be inserted in the recess of the then-heated article, the article cooling to the desired size and shape upon the mandrel. Thus I am enabled to eliminate the expense and time required to accurately size and shape the article by machining or grinding. Furthermore, by making the diameter slightly smaller than finally desired, as above explained, I insure the accurate sizing of a multitude of the articles about the mandrel even though the material of each article may not be exactly similar to and have exactly the coefficient of expansion of each other article in the lot.

When it is desired that the article be hardened, the foregoing process is carried out and proper steps are taken to insure hardening, such as employing material that will become hard by chilling while upon the mandrel. In this way the article is not only hardened but when hardened its recess is given the desired size and shape, thus rendering unnecessary any subsequent machining or grinding.

In Fig. 1, A indicates the article operated upon which is shown in such figure as being the cylindrical race of a ball bearing. The reference character 1 indicates the mandrel which is inserted in the recess of said article and about which the article cools as previously explained.

In Fig. 2, the article to be operated upon is shown as the race ring B of a ball bearing, this ring being dished in a well understood manner to receive the balls. One mandrel entering the recess of the ring is shown at 2, this mandrel being, under these conditions, preferably a plunger which bears against the ring and confines such ring between the plunger and a suitable worktable or other support 3. This pressure assists in preventing warping of the ring when cooling. Preferably the worktable or support is formed with a projection 4 upon it, this projection becoming a mandrel which enters a portion of the recess of the ring as clearly shown, so that the ring cools about the two mandrels 2 and 4.

The foregoing process is an extremely simple and inexpensive one to practice, and it has been found to produce most accurate and satisfactory results. Furthermore, when applied to articles being hardened it eliminates the necessity of subjecting the hardened articles to the additional and relatively expensive operation of grinding or machining the recesses to the desired size after the hardening process.

Having thus described my invention, what I claim as new and desire to secure by Letters Patent is:

1. The process of sizing and shaping recessed articles which consists in heating the article until it so expands that its recess is of greater diameter than the following-mentioned mandrel, inserting a mandrel in said recess without stretching the latter, permitting said article to cool and thus contract upon and about said mandrel, and then removing said article from the mandrel; substantially as described.

2. The process of sizing and shaping recessed articles which consists in heating the article to be operated upon, and permitting it to cool about and upon a mandrel received in the recess of said article and while said article is subjected to pressure; substantially as described.

3. The process of sizing and shaping recessed articles which consists in heating the article to be operated upon, permitting it to cool and thus contract about and upon a mandrel received in the recess of said article, and simultaneously with said cooling subjecting the article to pressure exerted in a line transverse to that of its said contraction about the mandrel; substantially as described.

In testimony whereof, I hereunto affix my signature, in the presence of two witnesses.

ALBERT F. ROCKWELL.

Witnesses:
GALES P. MOORE,
W. E. WIGHTMAN.